(12) United States Patent
Hirsch et al.

(10) Patent No.: US 7,379,945 B1
(45) Date of Patent: May 27, 2008

(54) VIRTUAL FOLDERING SYSTEM FOR BLENDING PROCESS AND CONTENT IN A COLLABORATIVE ENVIRONMENT

(75) Inventors: Peter D Hirsch, Danville, CA (US); Abhideep Singh, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 10/690,255

(22) Filed: Oct. 20, 2003

(51) Int. Cl.
*G06F 17/00* (2006.01)
(52) U.S. Cl. .................................. 707/102; 707/104.1
(58) Field of Classification Search ................ 707/102, 707/104.1
See application file for complete search history.

(56) References Cited

U.S. PATENT DOCUMENTS

| | | | |
|---|---|---|---|
| 6,348,927 B1* | 2/2002 | Lipkin | 345/619 |
| 2003/0172049 A1* | 9/2003 | Choy et al. | 707/1 |
| 2003/0200224 A1* | 10/2003 | Zhang et al. | 707/102 |
| 2003/0204537 A1* | 10/2003 | Liang et al. | 707/203 |

* cited by examiner

*Primary Examiner*—Joon Hwan Hwang
(74) *Attorney, Agent, or Firm*—Schmeiser, Olsen & Watts; John R. Pivnichny

(57) ABSTRACT

A system and a process for combining document management and issue management with a hierarchical set of process steps in a unified context is described. A virtual foldering system provides a basic container for documents, issues, process steps, and other components. Each process step (or "task") is a virtual folder, which can contain contents and other process steps, thus resulting in a hierarchical definition of the overall process and content. The hierarchy of components may be described in extended markup language ("XML") and then deployed into a relational database management system ("RDBMS"), where it is used to define the structure of a process-driven application. Access control and personalization for users are provided through a permissions scheme that is based on user groups, roles, and organizations. Users are only presented with their assigned tasks and issues, as well as other portions of the process they need to be aware of. Associations provide linkage of components across contexts and thus sharing of information among activities and between groups. In addition, a formula-based calculation engine provides simplified access to information for integrated reporting and definition of custom business logic.

7 Claims, 12 Drawing Sheets

FIG. 6
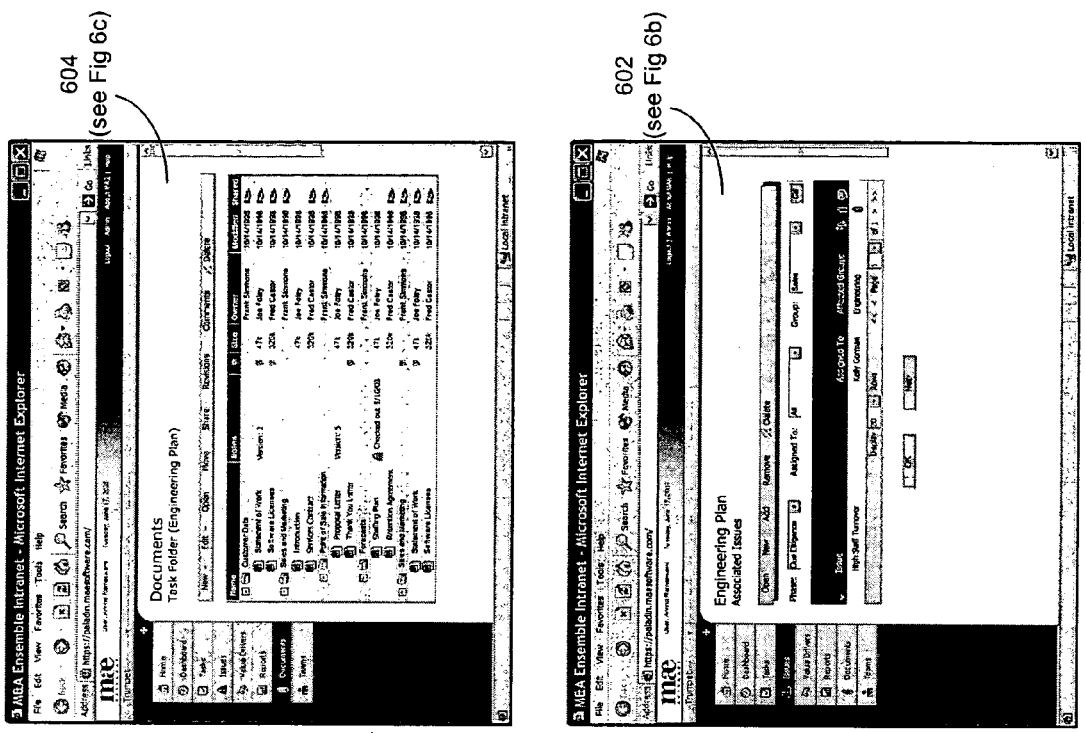
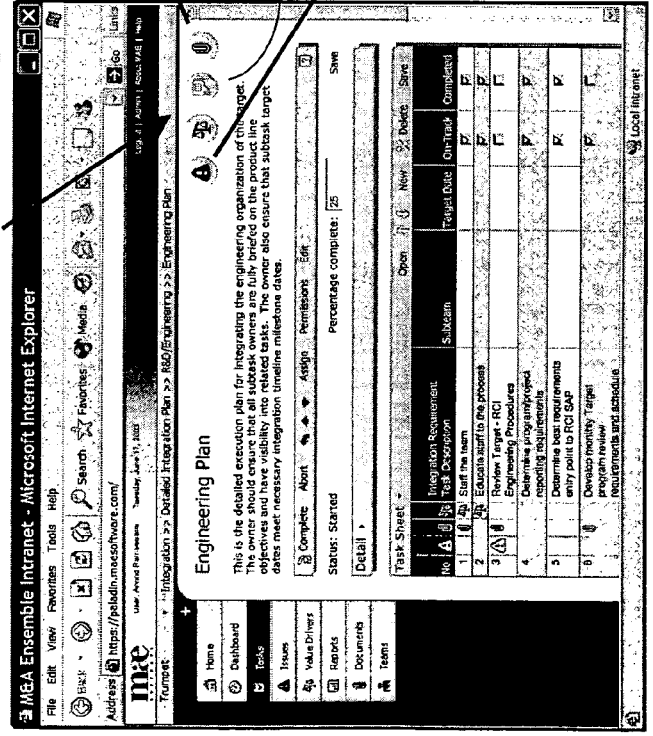

FIG. 8
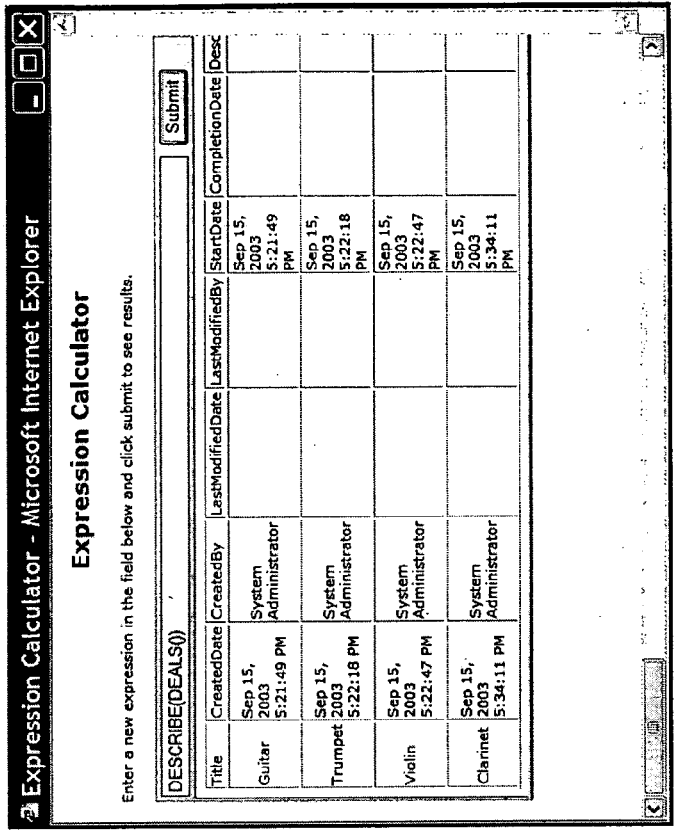
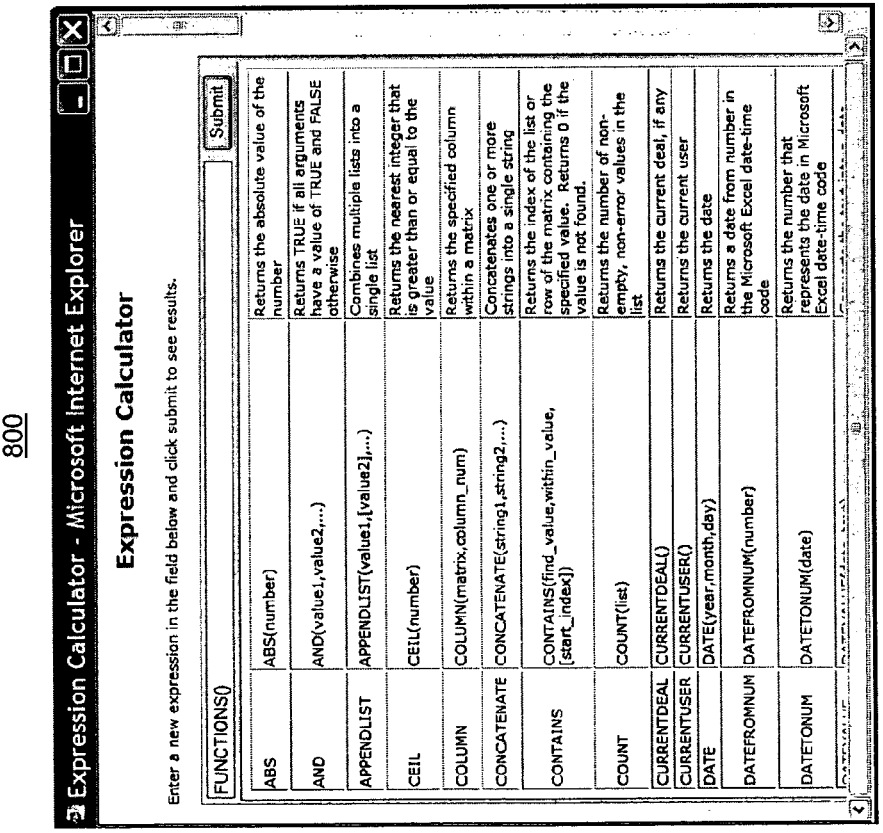

VIRTUAL FOLDERING SYSTEM FOR BLENDING PROCESS AND CONTENT IN A COLLABORATIVE ENVIRONMENT

BACKGROUND OF THE INVENTION

1. Field of the Invention

The present invention relates to a system and method of document management and issue management with a hierarchical set of process steps, which is used to execute and coordinate a collaborative process involving cross-functional organizational units across an enterprise.

2. Description of the Related Art

Over the last twenty years software has played an increasing role in automating routine business activities such as storing and cataloging information, providing summarizations and reports, tracking digital and physical assets, and securing access to sensitive or compartmentalized information. The category of software that addresses such activities is defined as content management. At the same time, software has also aided businesses in organizing processes such as product development projects, supply chain procurement, and call tracking systems. The category of software that addresses these activities is defined as process management.

More recently, a partial blurring of these two categories has provided companies with the ability to add workflow (a simplified form of process) to content management activities. This has allowed companies to automate a number of collaborative activities such as routing documents for editing and approval, documenting and resolving product defects, and preparing and approving consolidated financial budgets. However, in each such case, process (in this case, workflow) has been added to the content (e.g., documents, defects, budgets). Rarely, if ever, is process itself—especially in the form of a hierarchical set of tasks—the container for content.

There are a number of useful applications demanding tighter integration of process and content. Such applications are typically very collaborative in nature and are often very dynamic, where the process may change and adapt with learnings along the way. Examples of such applications include mergers and acquisitions and one-time, cross-functional initiatives such as ISO-9000 compliance and six-sigma quality certifications. For instance, in a large merger integration planning exercises often result in information that affects the structure of the activities involved in the integration execution phase. In effect, the first phase of the process is to define the second phase of the process.

Documents and information are collected during each step of the process and need to be stored in the context of the process step so they may be easily found later. At the same time, issues are identified that need to be resolved and tracked as a separate workflow process within the overall process. Relevant documents need to be associated with these issues, so a storage context needs to also be available within issues.

Furthermore, in such complex processes, content, issues, and tasks (process steps) are often interrelated, so a flexible model is required that allows cross-context relationships to be captured. For example, a document uncovered during a task may result in an issue, which is resolved through a series of new tasks that must be performed. The interrelationships between the original task, the document, resulting issue, and resolution tasks must be captured and tracked as a part of the process.

Complex processes also tend to involve large numbers of cross-functional participants, where authority and ownership are diffused across an organization. This often results in the need for compartmentalization of information—especially when sensitive or confidential information is involved. In a merger, for example, payroll inconsistencies in an acquired company can lead to challenging issues for a Human Resources department, but they become even more disruptive if surfaced to an extended integration team involving other departments. As a result, applications that provide storage of content within a process must provide an integrated security scheme that recognizes roles and organizational hierarchies. Permissions also need to be dynamic to allow lockdown of content automatically as process steps are completed.

The difficulty in blending process and content is that they are both typically hierarchical in nature, and the relationships between the components in each hierarchy can be complex. Process involves tasks, tasks involve subtasks, subtasks involve even finer-level subtasks, and so on. At the same time, documents are grouped into folders, which are in turn grouped into high-level folders. In addition, the hierarchy of organizational units and involvement of cross-functional teams adds yet a third dimension that must be factored into a unifying model. The technical integration of these hierarchies is quite complex. Moreover, the challenge is to integrate the hierarchies in a manner that is intuitive to users of such a system and process.

Therefore, there is a need for a system and method that offers a unified model of process and content, that is intuitive to users, and that conforms to the hierarchical structure and information needs of an organization.

SUMMARY OF THE INVENTION

The present invention provides a unified model blending process and content, which combines document management and issue management with a hierarchically structured process of phases and tasks. Each step in the process constitutes a virtual folder that may contain documents, issues, and physical folders, as well as other process steps. Issues are in turn virtual folders that may contain documents and sub-hierarchies of information. Documents are also virtual folders that may contain each of the revisions of the document. In fact, each element in the hierarchy, which may be referred to as a component, constitutes a virtual folder.

A virtual folder has a unique path description that is analogous to a file path, but is instead described in a XPATH expression language defined for extensible markup language ("XML"). Each component has a containment policy that determines the type of subcomponents it may accept. Document components, for example, may only contain revisions of the same document, as well as discussion threads that capture user comments and replies.

Each component in the hierarchy is comprised of a set of fields that define its content. Task components for example, include task name, owner, start date, dependencies, and so on. In addition to pre-defined fields, components may also contain any number of custom fields for capturing information relevant to the specific task or other component. This provides the ability to store not just documents, but also granular bits of information in context, and also forms the basis for collaborative information gathering. A containment policy for a component may enforce the existence of a common set of custom fields within its child components. When these children are displayed together in a columnar table, each field is mapped to a column and the user can edit them much as with a simple worksheet, except that each row in the worksheet corresponds to a separate assignable component with independent access control.

Fields may be related to other fields through mathematical formulas used to define their value. Formulas are defined in a syntax similar to common spreadsheets. References to fields in other components are based on a set of functions that understand and expose the internal data model of the application, thus obviating the need for Structured Query Language ("SQL") or conventional programming.

Associations between components are maintained both as parent-child relationships within the hierarchy and as independent association objects when they span contexts across the hierarchy. For example, an issue that is associated with a task does not have to be stored in the task's virtual folder because it may be associated with other tasks as well. Instead, the issue may be stored in a separate list under the main process component, and entries are made in an associations table, which track the relationship between the two components. In a user interface for the system, indicators are used to inform the user when such associations are present.

The overall process model, comprised of components and relationships, may be defined in the form of a hierarchical set of XML documents that is tailored to a particular process. This XML definition is deployed into a server at configuration time and then persisted in a database to define a process-oriented application. Process changes are made through the user interface as necessary, and at any point, the complete process and content may be exported from the database back into XML. In addition, a completed process may captured as a process template, which may be stored in a library and used as the beginning point for new processes of the same structure.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings, in which like reference numerals refer to similar elements, and in which:

FIG. ("FIG.") 1 is a block diagram of a functional platform architecture in accordance with one embodiment of the present invention;

FIG. 8 is a screen shot of a user interface for a popup calculator, which is used for testing formulas when they are needed in accordance with one embodiment of the present invention.

DETAILED DESCRIPTION OF THE PREFERRED EMBODIMENT

The present invention includes a system and a method for a unified blending of process and content that combines document management and issue management with a hierarchically structured process of phases and tasks. In one embodiment of the present invention, a system and method includes operation on a Java 2 Enterprise Edition ("J2EE") platform. Further, in one embodiment the system and method may be applied for use in managing processes and information involving corporate mergers and acquisitions. For ease of discussion, the present invention will be described in the context of a J2EE platform and a mergers and acquisition application. However, one of skill in the art will recognize that the principles of the present invention are not limited to the J2EE platform or its application to mergers and acquisitions. Rather, the principles of the present invention disclosed herein may be implemented on, for example, any native computing environment or a platform such as Microsoft.NET. Moreover, the principles of the present invention disclosed herein may also be applied to a broad set of collaborative activities involving both process and content, for example, product lifecycle management ("PLM"), corporate restructurings, new manufacturing facilities development, ISO certification, or even generic projects of any form.

Platform Architecture Overview

Figure 1:
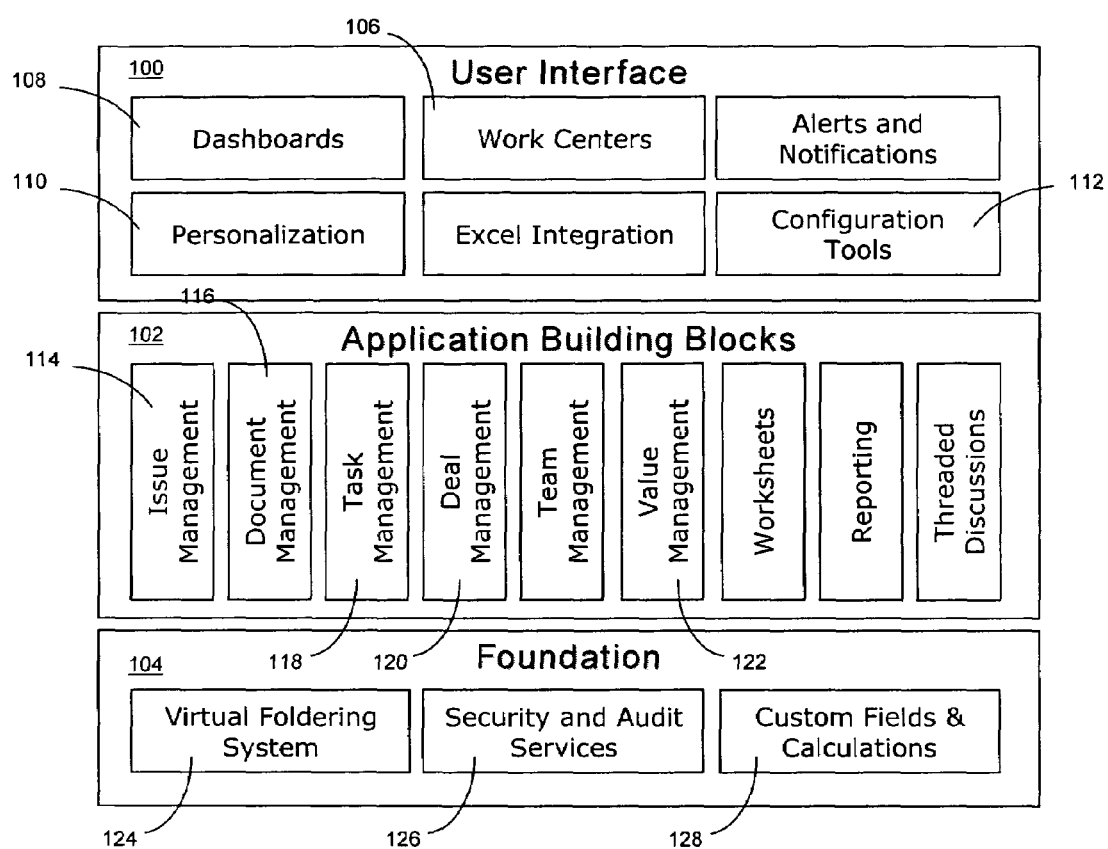

FIG. 1 illustrates an architecture of a functional platform architecture in accordance with one embodiment of the present invention. The platform is built on a layered architecture that separates a user interface layer 100 from an application layer 102 and a foundation layer 104. The layered architecture provides a high degree of modularity, as well as a loosely coupled architecture for customization and expansion. In one embodiment, the user interface layer 100 may be built on Java Server Pages ("JSPs") and servlets to serve up web pages over a network, for example, an Internet or a local Intranet.

The user interface layer 100 includes one or more work centers 106, one or more dashboards 108, a personalization module 110, configuration tools 112, alerts and notification and Excel integration. The work centers 106 include a set of web pages for each component module in the application layer. The dashboards 108 are provided for summarization of status and outstanding issues, and include an application home page that may be tailored to an individual's needs with the personalization module 110. The configuration tools 112 are built into the application to allow processes to be dynamically modified before or during the process. They also allow the creation of custom fields (further described below) for tasks, deals, and other components for complete customization of an application without code changes.

The application layer 102 includes separate modules for each primary component type, such as issues 114, documents 116, tasks 118, and deals 120. This allows domain-specific concepts related to, for example, mergers and acquisitions, to be separated out within the application layer 102 to maintain applicability to a broad set of other types of problems. For instance, a concept of value drivers is used commonly in mergers and acquisitions, so a separate value module 122 is provided with the platform.

It is noted that for a different application, an alternate module or set of modules could be provided. For example, the application layer may also include modules such as team management, worksheets, reporting, threaded discussions and the like depending on the type of application or project the system and/or the method of the present application is applied to. Further, it is noted that modules are also responsible for implementing workflow and state management that may be associated with an underlying component.

Beneath the application layer 102 is the foundation layer 104. The foundation layer 104 includes a virtual foldering system 124, security and audit services 126, and custom fields and calculations 128. The virtual foldering system 124 provides the integration of all components, their persistence in the database and XML files, and support for optional workflow provided by the application layer modules 102. Security and audit services 126 provide access control based on a role-based permission scheme, along with audit trails for actions performed by users. Finally, custom fields and calculations 128 support configurability of components in the system and dynamic business logic that is defined through formulas, which may be pre-determined or programmed.

Virtual Foldering

In one embodiment of the present invention, both process and content are hierarchical in nature. Although, it may be natural to employ a hierarchy of some form as the base container for the application, unification of two hierarchies into a meaningful and well-structured metaphor has been difficult until now. To address these shortcomings in the conventional art, one embodiment of the present invention employs a virtual foldering system to serve as the foundation for this metaphor.

Figure 2:
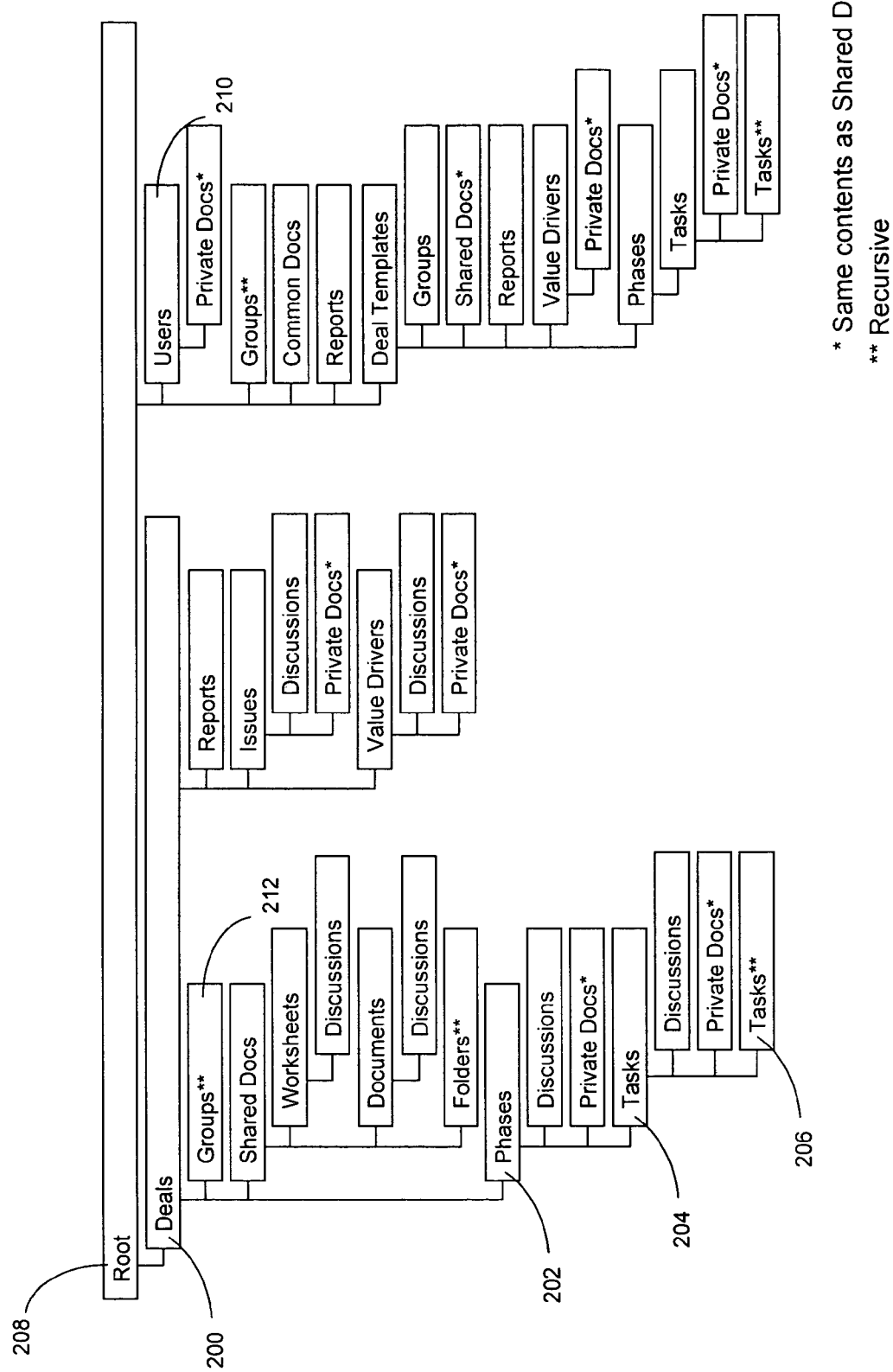
FIG. 2 is a diagram of a component hierarchy defined by a containment policy in accordance with one embodiment of the present invention.

FIG. 2 displays the hierarchical structure of the virtual foldering system 124 in accordance with one embodiment of the present invention. Generally, processes are described as a set of tasks with an associated workflow. For example, a top-level process is characterized as a deal 200 in a mergers and acquisition application context. Within the deal 200 are a set of phases 202, which are each comprised of a grouping of tasks 204. The phases 202 may be another form of a task with a special name based on their position in the hierarchy. The tasks 204 in turn have subtasks 206; subtasks 206 in turn have subtasks, and so on, thus comprising the hierarchy. Deals 200, phases 202, and tasks 204 constitute three types of components. Components are further described below.

Components in the hierarchy that contain other components are termed parent components, while the components they contain are termed child components. A given component can be both a parent component and a child component. Child components that do not contain any components themselves are termed leaf-level components. The top-level parent component that itself has no parent is termed the root 208 component.

Tasks (e.g., 204) and issues are assigned to individual users 210 or groups 212 of users, who are responsible for their completion or resolution.

Components

Figure 3:
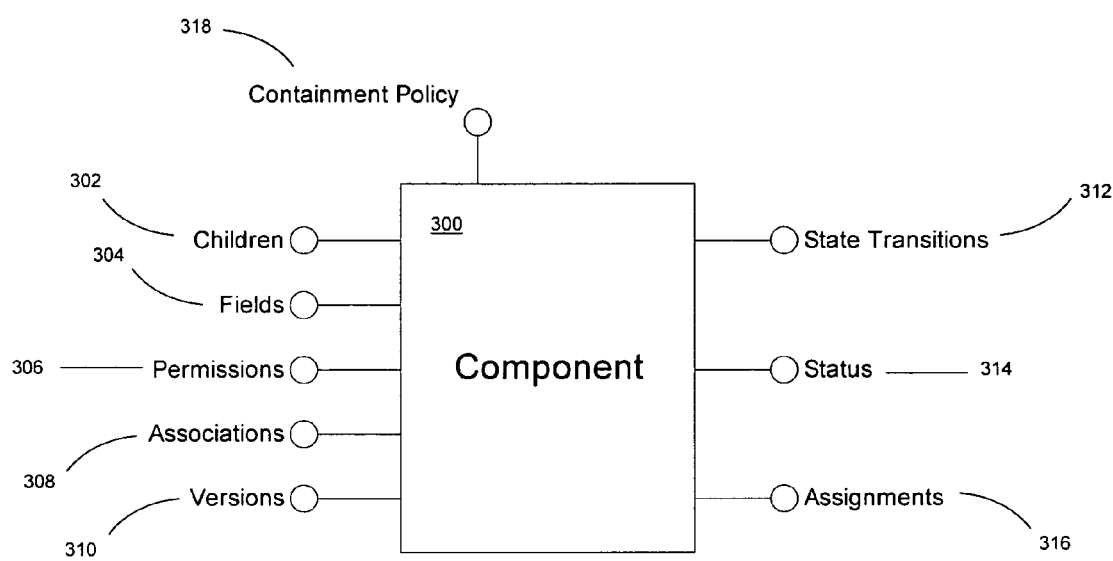
FIG. 3 is a conceptual interface diagram for a component, which serves as a basis for managing information hierarchies, associations, and workflows in accordance with one embodiment of the present invention.

FIG. 3 illustrates a basic structure of an abstract component object 300, which may serve as a foundation for all derived component types described previously in accordance with one embodiment of the present invention. The component object 300 provides a set of application programming interfaces ("API's") for managing information hierarchies, associations, and workflows. In one embodiment, it may be similar to a foundation of a file system, in that it has an API for managing child components 302, fields and attributes 304 associated with the component 300, and permissions 306. In addition, it also has an API for managing associations 308 between components that span the hierarchy, as well as multiple versions of a given component 310. This API provides locking of derived components, check-in and out, concurrency control, and audit and traceability. Collectively, these API's provide support for managing content.

The component object 300 also provides several API's for managing workflow, which makes the component base class ideally suited for blending both content and process within the same hierarchy. A state transitions 312 API provides the capability for a derived component type to define its set of legal workflow states, as well as predetermined or configurable rules for transitioning between one state and another. A status 314 API provides control over the progress of a workflow activity in terms of percentage completion. Finally, an assignments 316 API provides the ability to specify the user or group responsible for performing operations (e.g., tasks or issue resolution).

To tie content and process interfaces together, a containment policy 318 API is provided to define the legal contents of a component, in terms of child component types, uniformity among field types for child components, and workflow linkage between components.

Tasks

Figure 4:
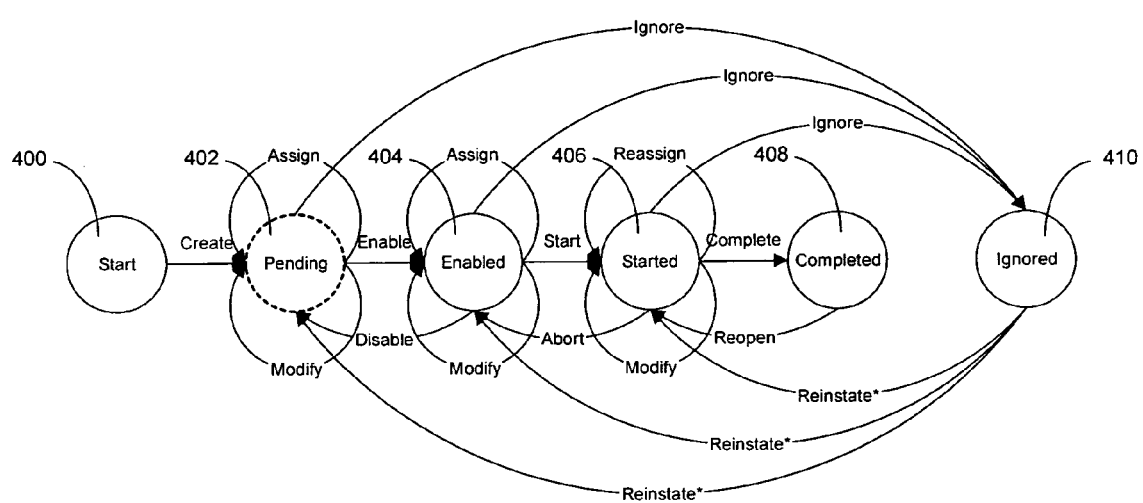
FIG. 4 is a state transition diagram for a workflow lifecycle of a task in accordance with one embodiment of the present invention.

FIG. 4 illustrates individual workflow states and state transitions that characterize the lifecycle of a task in accordance with one embodiment of the present invention. After a task is created at a start 400 state, it is moved into a pending 402 state, where it awaits until all dependencies are satisfied. It is then moved into an enabled 404 state, where it awaits an assignee to start and then complete the task. Once completed, the issue is moved into the started 406 and completed 408 states, respectively. The workflow for a task may be configured to skip the pending state 402 and automatically enable the task, regardless of whether dependencies are satisfied. This provides flexibility for users to override otherwise restrictive process constraints.

Issues

Figure 5:
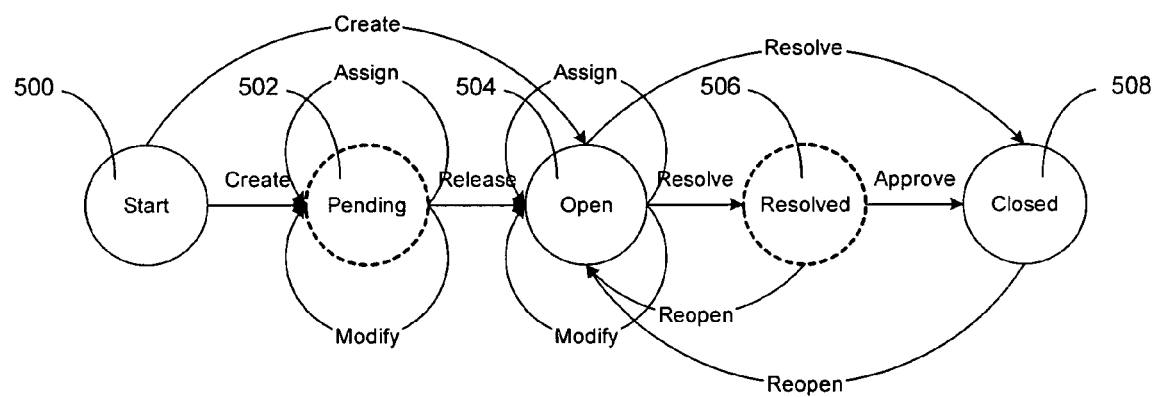
FIG. 5 is a state transition diagram for a workflow lifecycle of an issue in accordance with one embodiment of the present invention.

Also an integral part of a process is the set of issues that arise as a byproduct of performing a task. The issues themselves have a separate workflow associated with their resolution as shown in FIG. 5. Like tasks, issues constitute a type of component that is assigned to individuals or groups of individuals.

Once an issue has been identified and created 500, it is moved into an optional pending 502 state, where it awaits release by an issue authority. Once released, the issue is moved into an open 504 state, where it awaits an assignee to resolve the issue, and then the issue authority to approve the resolution and close the issue. Once resolved and closed, the issue is moved into resolved 506 and closed 508 states, respectively. Like the workflow for tasks, the workflow for issues may be configured to optionally skip the pending 502 and resolved 506 states for users wanting a simplified process involving, for example, two or three steps to close an issue.

Associations

Since issues are often encountered within the context of a task, the system allows the user to create an issue in association with a task. The system then maintains the association for historical context. Conversely, in the course of resolving an issue, the assignee will often have to create and schedule additional resolution tasks, so the system provides support for adding associations to the resolutions task. In one embodiment, issues may be associated with more than one task. In this embodiment, then, issues cannot be directly contained in the task hierarchy. Instead, they are contained in a linear list under the deal component.

Documents and Folders

Content is comprised of documents that are created and accumulated as a function of completing tasks and resolving issues. In one embodiment of the present invention, each component (tasks, issues, deals, etc.) is implemented as a virtual folder that can contain a set of documents as well as physical folders that can recursively contain documents and other folders. Virtual folders may also contain references to components other than their own child components. This allows versatile cross-linking and sharing of components across the hierarchy. A containment policy is maintained for each component and determines the types of subcomponents it may contain.

Figure 6A:
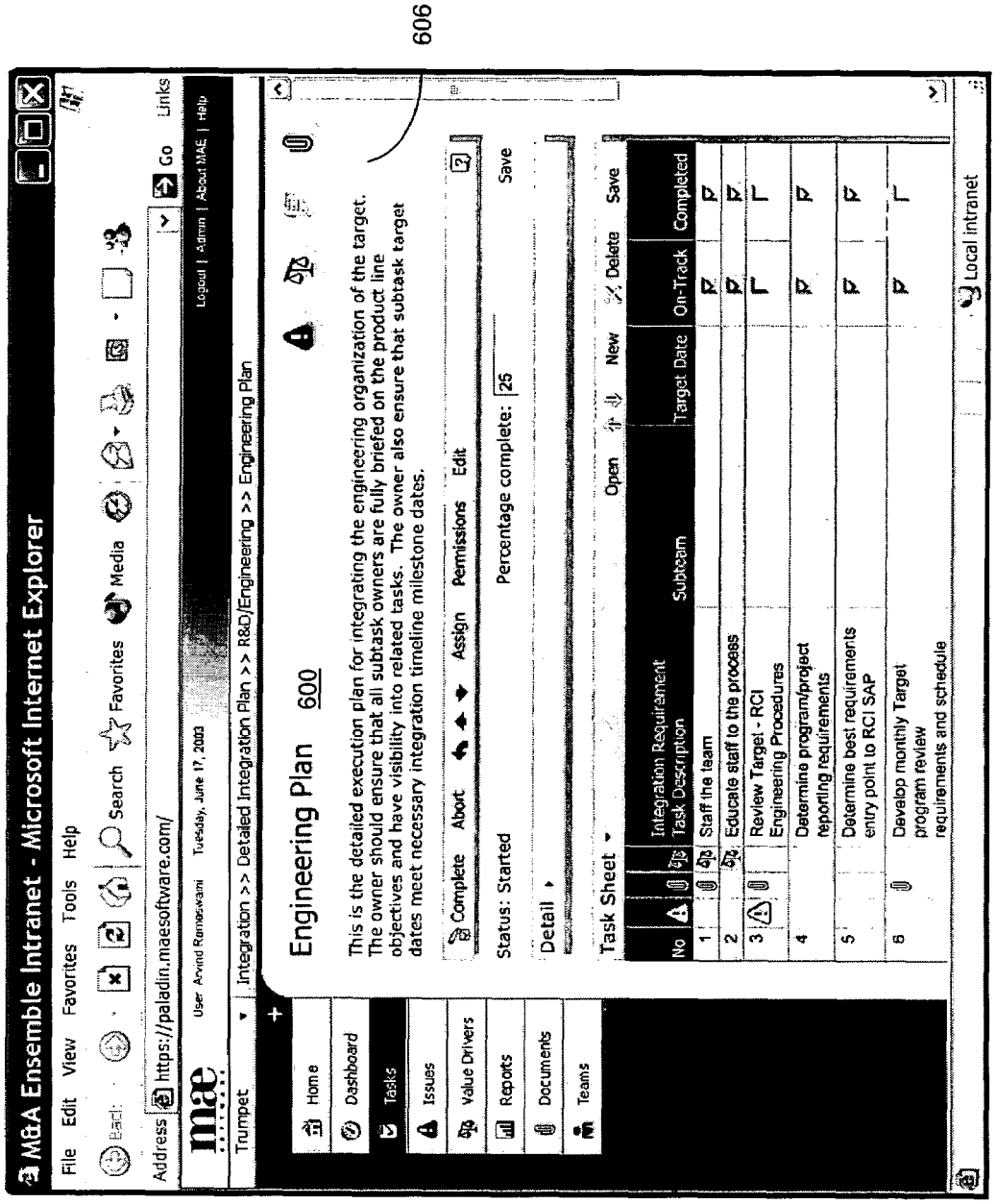
FIG. 6 is screen shot of a user interface for a task, along with context-based associations to related components in accordance with one embodiment of the present invention.
Figure 6B:
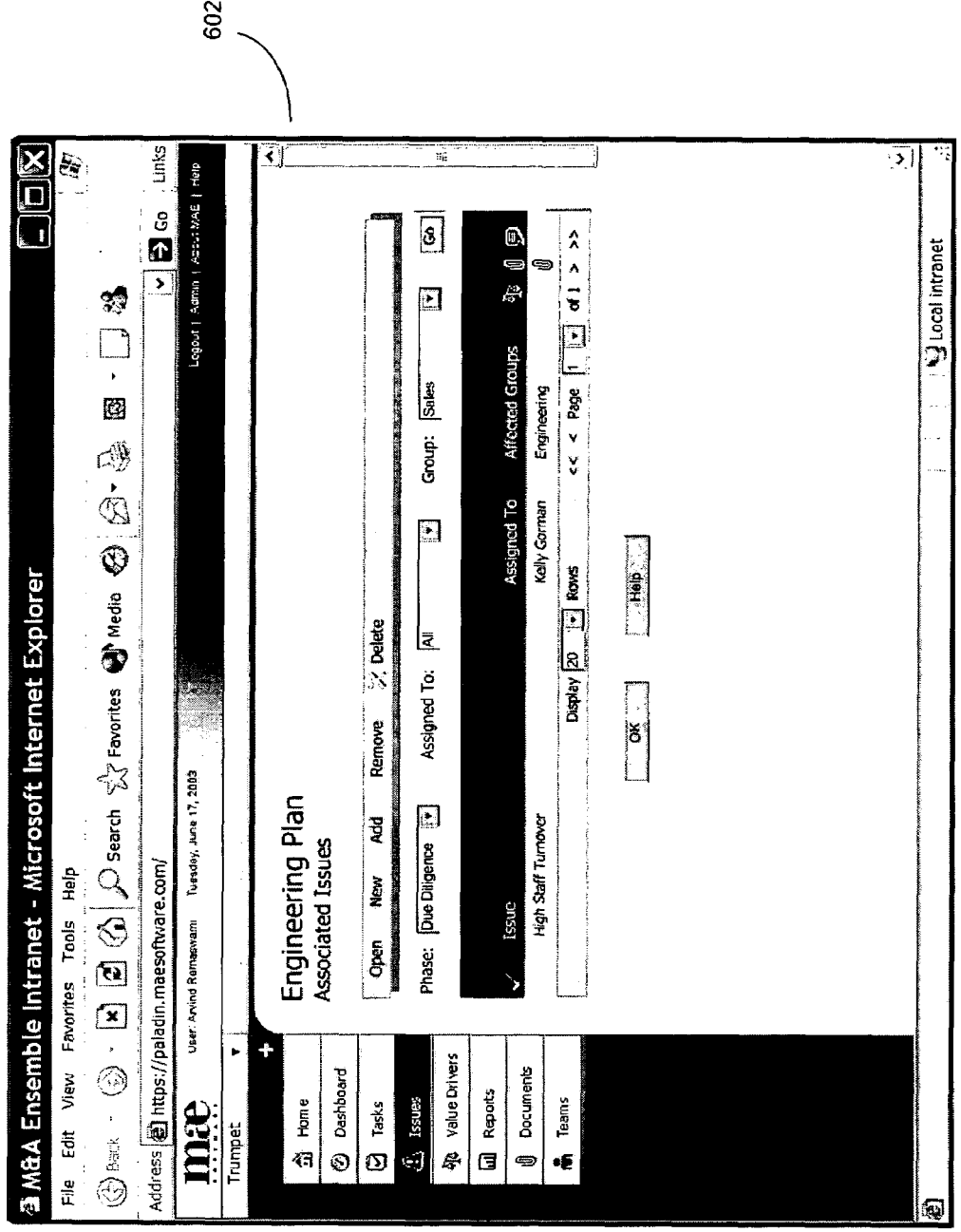
Figure 6C:
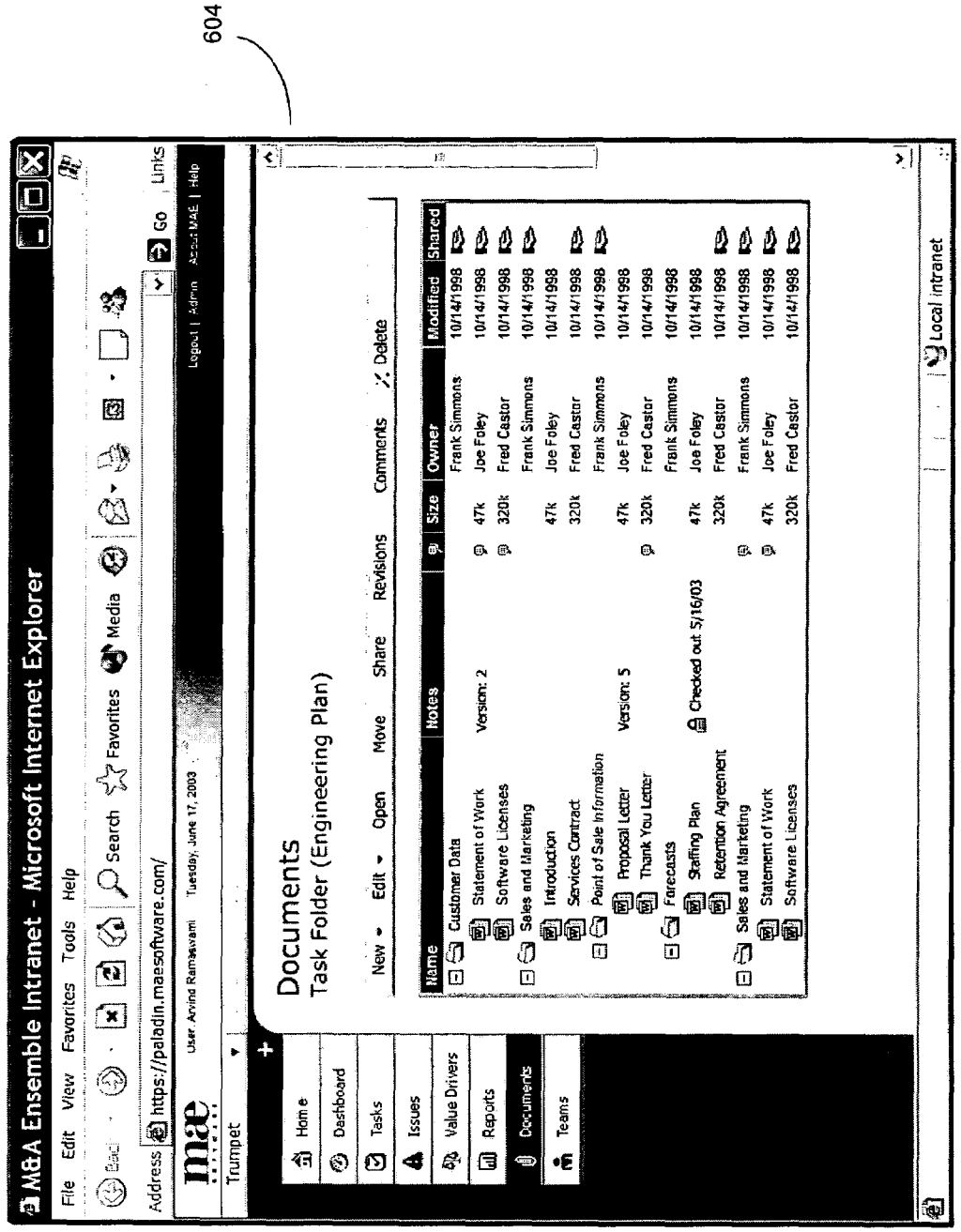

Turning to FIG. 6, it illustrates an example of a user interface for a task 600 that is associated with an issue 602 and set of documents 604 in accordance with one embodiment of the present invention. The presence of associated content in the task's virtual folder is indicated by four indicator buttons 606 at the top of the screen. Each button maps to a different type of content. Buttons are highlighted when associated components are present in the virtual folder and are faded otherwise. Clicking on a button opens a page showing the corresponding content and providing a set of commands for adding, editing, or deleting the content.

Component Fields

In addition to the content in a component's virtual folder, components are comprised of more granular elements in the form of individual fields that store related information in context. Fields are exposed to a user through specialized worksheets. For tasks, these specialized worksheets are known as "task sheets", since they contain an editable list of subtasks in each row and associated fields across the columns.

Figure 7:
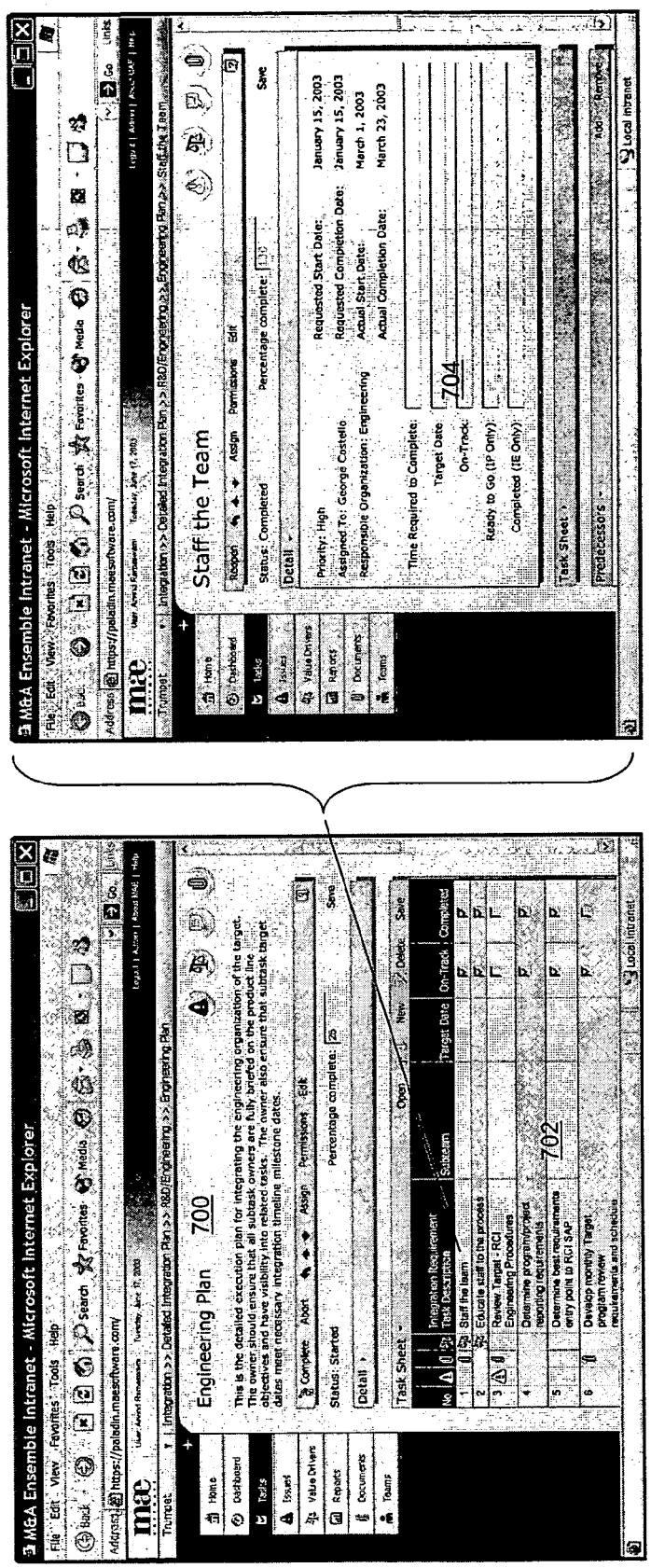
FIG. 7 is a screen shot of a user interface for a task, its task-sheet, and its corresponding subtasks in accordance with one embodiment of the present invention.

Referring to FIG. 7, it illustrates an example of a user interface for a task 700 and its associated task sheet 702. The task sheet 702 is expanded into detail fields 704 when a subtask is opened. When editing the task-sheet 702, a user may insert and delete rows, thus effectively inserting and deleting subtasks, or they may insert and delete columns, thus effectively creating or deleting user-defined fields common to each subtask.

Each field 704 has a value and is defined in terms of a name and user-friendly label, a field type, and optionally, an expression-based formula. The field type may be reused across multiple fields and consists of a data type, an editor, and optional constraints. The field's name and type allow its value to be referenced elsewhere in the application through a formula, thus permitting dynamic relationships to be established between components in the application hierarchy.

Constraints are also expressed as formulas, where the value entered by a user is tested in an expression to determine whether it is valid or invalid. The formula evaluates to a Boolean "TRUE" if the value entered by a user is valid, or "FALSE" if it is not. As an example, if the value of a field must be within a range of 1 to 5, the constraint formula would be as follows:

=AND(VALUE>=1, VALUE<=5)

An editor for a field is specified as a part of its field type and determines what user interface input element will be displayed to a user when a field is edited. Examples of editor types include:

General edit field—standard textbox

Checkbox—standard Boolean true/false

Checkbox group—set of independent, but related checkboxes

Radio button group—set of 2 or more mutually exclusive options

Selection box—selection of named values displayed in a combobox or listbox

Calendar—popup calendar for specifying a date

Editor types that provide a set of options to a user (such as checkbox groups and selection boxes) accept either a static list of label-value pairs or a formula-driven list of label-value pairs. Labels are used for display in checkbox and radio button titles and in selection box options. They are translated to values if separate values have been provided. Otherwise, the values will be the same as the labels.

Calculations

A calculation engine is provided to evaluate formulas that define dynamic relationships between components and to serve to assist with built-in reporting. Built-in functions are provided to expose the internal data model of the application so values may be queried and manipulated without the need for SQL or conventional programming. For example, to create a personalized report for the current user that allows him/her to search for preliminary analysis tasks that were assigned to them by priority, a report expression could be defined as follows:

TASKS(CURRENTDEAL( ), "Preliminary Analysis",
"AND(CONTAINS(AssignedTo, CURRENTUSERo),
Priority=Param)",
"Title", "Priority", "AssignedTo")

where 'Param' is an input parameter defined as a dropdown input selection for the user that lists all priority codes. In this expression, the first argument returns the deal associated with the report, the second argument defines the path of the parent task for all subtasks to be retrieved, the third argument defines the search filter, and the final three parameters define the task fields to be returned and displayed in the report.

FIG. 8. illustrates one embodiment of a popup calculator that is provided to allow the user to experiment with formulas interactively when they are needed. A set of information functions is included to facilitate the experimentation, including functions to retrieve information on the metadata for components as well as for functions themselves. A FUNCTIONS( ) function, for example, returns help 800 on the list of all functions available. A DESCRIBE ( ) function 802 displays all field names available for a set of components along with their values.

A set of lookup functions is provided for accessing each type of component in the system. Each component type has at least two lookup functions—one that returns an individual component (e.g., TASK( ), ISSUE( ), FILE( ), etc.), and one that returns a list of components (e.g., TASKS( ), ISSUES ( ), FILES( ), etc.). Single-object lookup functions return either an object or a one-row matrix, while multiple-object lookup functions return either a list of objects or a complete matrix. When no fields are specified, the object or list of objects is returned. When one or more fields are specified, a matrix is returned. The choice of whether to include the specification of fields depends on what the function is being used for. Most often, when the function is used as an argument to another function other than a matrix-manipulation function like SORTROWS( ), the field specification is omitted. For example, the TASK( ) function requires a deal object as its first argument. In this case, no fields are specified for the DEAL( ) function as in the following example:

TASK(DEAL("Trumpet"), "Preliminary Analysis/Financial Plan", "*").

In this example, a set of fields has only been specified for the TASK( ) function, using the wild card '*' designation. The wild card specifies that all fields for the task are to be returned.

Functions are provided to extract field values from an object or list of objects when no fields are specified or when the objects are contained in a virtual field. A FIELD( ) function returns an individual value, while a FIELDS( ) function returns a matrix of values. For example, the expression FIELD(CURRENTDEAL( ), "Title")

returns the title of the current deal.

Most objects in the system are retrieved relative to a parent object, which is specified as the first argument to the lookup function. In some cases, a path is also required to describe the position of the object in the hierarchy underneath the parent object. A path is very much like a tradition file system path, with folder or task names appended with intervening slash ('/' or '\') characters (e.g., "Preliminary Analysis/Financial Plan"). To facilitate recursive search, however, a special descendant search specifier ("/ . . . ") can be appended to the end of the path to indicate deep traversal of all subfolders.

The values returned by a lookup function may be specified in one of three ways: either by wild card, a list of field names, or list of expressions. In most cases, each argument is surrounded by single or double quotes. A wild card '*' specifier returns the set of all fields defined for an object or list of objects. When the wild card is specified for a list of objects, all objects must be of the same type, and only the fields defined by the first object in the list will be returned, regardless of the additional custom fields that might be defined in subsequent objects.

The field specification may also be an explicit list of the field names for an object (or list of objects). A field name may be included any number of times or in any order, and the result set will reflect the corresponding values in the proper order. An explicit field specification is usually more useful than the wild card since it is much more efficient and eliminates extraneous fields. The order of columns returned is also unaffected by changes to the set of custom fields defined for a component.

Expressions may also be used in a field specification when values need to be manipulated before they are returned. For example, the following expression returns the current user's first and last names together in a single string, separated by a space character:

USER(CURRENTUSER( ), "CONCATENATE(FirstName, ' ', LastName)").

Field expressions typically are quoted so they are treated as a single argument. When the expression contains a string literal (as in the example), the quotes can be doubled up or alternated with single quotes.

All multiple-object lookup functions include an optional filter argument, which provides control over the set of objects that are included in the resulting list or matrix. The filter expression operates similar to field expressions, except that it is expected to return a Boolean TRUE/FALSE value for each object, indicating whether or not it should be included. For example, the following expression returns a list of only the issues assigned to the current user:

ISSUES(CURRENTDEAL( ), "CONTAINS(AssignedTo, CURRENTUSER0)", "*"). If the filter argument is left null, then all objects are returned.

Thus, the calculation engine beneficially provides users with a tool within the system to evaluate formulas and define dynamic relationships between components. In turn, this calculation engine provides a mechanism to assist with built-in reporting. Moreover, built-in reporting enhances and simplifies usability by providing exposure to an internal data model of the application so that values may be queried and manipulated without a need for SQL or other conventional programming to extract such information.

XML Deployment

In one embodiment, a process model for an application is comprised of all its components, relationships, and associated workflow. The model can either be developed interactively through the user interface or can be defined in the form of a hierarchical set of documents, for example, XML documents. If defined in XML, the model can be deployed into the server at configuration time and then persisted in the database for ongoing use.

Changes to the model are made through the user interface as necessary, and at any point, the complete model may be exported from the database back into XML. This provides a number of important benefits, including portability across databases, bulk changes, replication, and backup and recovery.

To implement model translation to and from XML, each component is provided an interface to a selectable set of data access objects ("DAOs"). One set of data access objects is tailored for database persistence, while another is tailored for XML persistence. A set of marshal/unmarshal methods is provided in the application programming interface ("API") for each DAO. The interface allows the internal binary content of the application to be serialized to and from the target storage protocol, thus respectively "writing" and "reading" the content as necessary. With DAO objects available for both the database and XML, it is a simple matter of reading the model in from one storage location and writing it back out to another.

Database Schema

Figure 9:
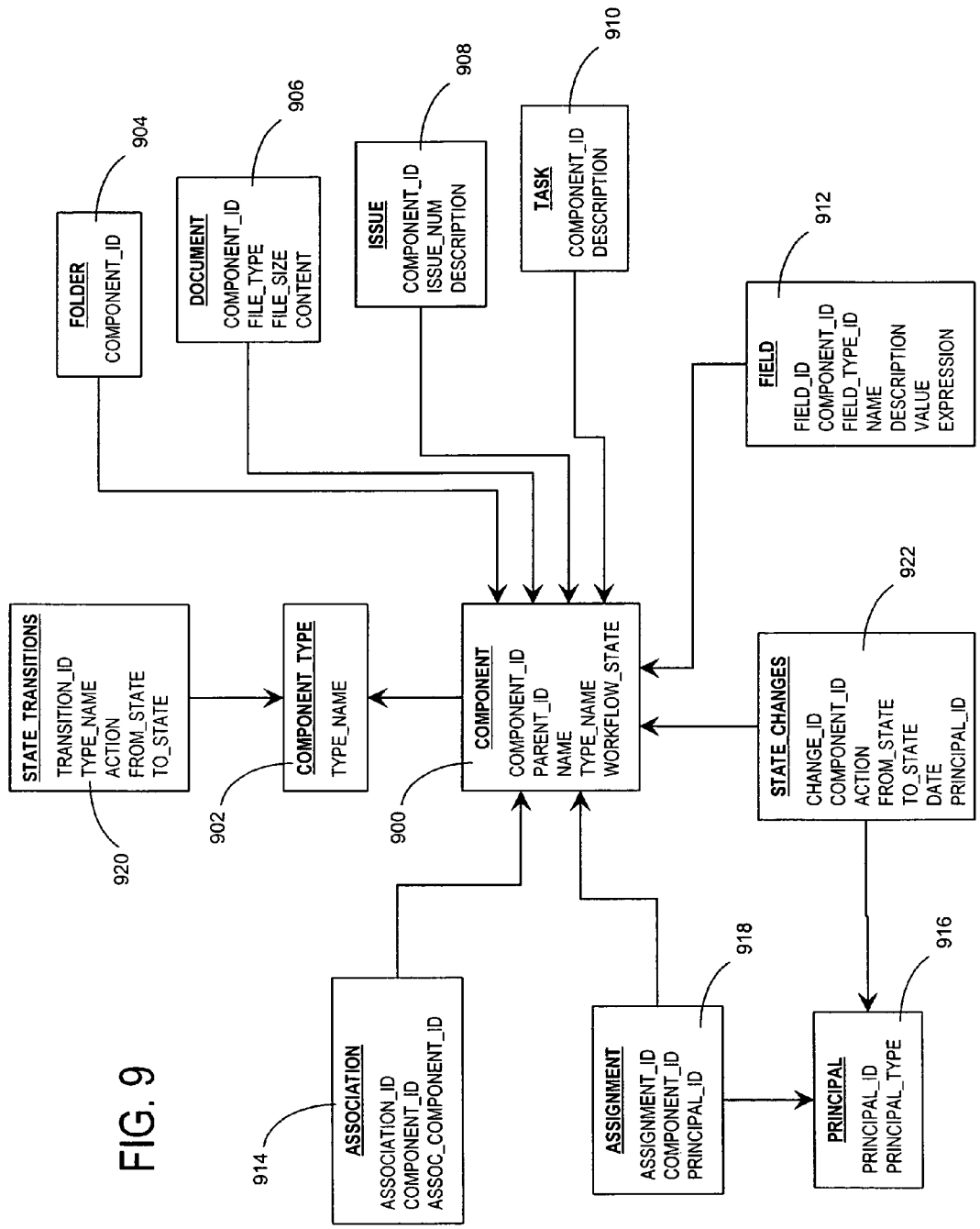
FIG. 9 is a block diagram of a portion of a database schema used to define components in a hierarchy in accordance with one embodiment of the present invention.

FIG. 9 illustrates a simplified block diagram of a database schema for use in accordance with one embodiment of the present invention. The database schema is configured to store components and their fields, workflow state, state transitions, and the overall hierarchy.

A central table in the schema is a component table 900. The component table 900 stores a record for each task, issue, document, and other component defined in the application. Components are identified by a unique, system-wide component ID that serves as a primary key for the table. The component table 900 is self-referential, which allows it to capture the hierarchy of the components. A parent ID column is configured as a foreign key that points to the component ID of a parent component. The parent ID is defined for all components except the top-level root component (e.g., 208), which has no parent. Each component has a name and a registered type, which is defined in a component type table 902. Components with an associated workflow also include a state value in a workflow state column.

Each component type registered in the component type table 902 also has an associated table for storing information specific to the type. These tables include (but are not limited to) a folder table 904, a document table 906, an issue table 908, and a task table 910. Each table includes a component ID, which not only serves as the primary key for the table, but also as a foreign key, pointing back to the corresponding component in the component table 900.

In addition to the built-in fields defined for each component type, components also support custom fields. While built-in fields are stored in the base component table 900 and associated type-specific tables, custom fields are stored in a separate field table 912. Each custom field is stored in a separate row and identified by a unique field ID that serves as the table's primary key. A component ID column identifies the component that owns the field. Each field is has a registered type, defined by the field type ID column, which points to a separate set of tables (not shown) that define the field's data type, editor, and constraints. This separation of field type definition from the field allows the field type to be reused across multiple fields. In addition to the field type, the Field table also defines columns for the field's name, an optional description, a value, and an optional expression. When an expression is defined for the field, the value column must be updated before being used whenever any dependencies have changed.

Associations between components are stored in an association table 914. An association ID column stores the primary key for each association, and two additional columns—a component ID column and an associated component ID column—store the IDs for the two components that are related. Both columns are foreign keys that point to components defined in the component table 900.

Users and groups are defined in a principal table 916, which is used for access control, workflow, and identification. Each principal is assigned a unique principal ID that serves as the primary key for the table and as the foreign key for other tables referencing a principal. A principal type column designates whether the principal is a user or a group. Like storage of component type-specific information, storage of principal type-specific information is stored in separate user and group tables (not shown).

Components such as tasks and issues that have an associated workflow are assigned to one or more principals for completion or resolution. These assignments are tracked in an Assignment table 918. The assignment table 918 includes a unique assignment ID that identifies the assignment, along with a component ID that points to the component, and a principal ID that identifies the responsible party. Since the table is separate from the component table 900 or derived component tables, multiple assignments may be made for a single component.

The workflow for a particular component type is defined by a state transitions table 920 that includes all its possible state transitions. By defining these transitions in a database table, workflow may be dynamically defined for each component type rather than being hard-coded in the application logic. Each row in the table defines a "from-to" state transition for a particular component type and assigns it a name. A transition ID column serves as the primary key for uniquely referencing a transition type.

A separate state changes table 922 defines the historical state changes for a given component. Each time the state of a component is changed, an entry is made into this table identifying the component, the action, the states before and after the change, the date and time the change occurred, and the user making the change. In addition, the workflow state column of the component table 900 is updated to reflect the latest state. The allowable state change operations supported for a component are defined in the state transitions table 920, based on the component's type.

A Unifying Application Model

The benefits of a unifying application model that combines process and content in a virtual foldering system and underlying formula-based calculation engine are considerable. The resulting integration dramatically simplifies administration, makes end users more productive, and supports capturing learnings that are factored back into the process afterwards.

Administration of cross-functional teams and security permissions is performed for documents, issues, tasks, and all other content all in one place, with distributed control across the organization. Unlike content management and project or process management systems that are tied together to major corporate initiatives, which have their own independent administration tools, group definitions, and permissions that must be kept in sync by centralized IT administrators, the present invention allows the end users in charge of leading the initiative to manage who has access to what information and when, with an integrated and easy-to-use interface.

Major corporate initiatives can also be very complex, with thousands of tasks, documents, and issues that need to be managed. An integrated system with personalized dashboards and home page displays based on an end user's role and access permissions reduces clutter and focuses the user on only what's relevant. Links between related components make finding information easier and improve decision making. At the same time, the end users in charge have access to status and issue summaries through reports displayed in their home pages. Built-in functions make creation of new reports by end users straight forward without the need for third-party reporting tools that must be used by information technology ("IT") departments and that directly access the database, therefore bypassing all built-in security.

The dynamic nature and complexity of such initiatives also makes capturing learnings along the way and feedback into subsequent initiatives very important. Without an integrated solution, this can be very difficult and time-consuming. Each system would have to be set back up after stripping out the content and re-integrated together. In an integrated system, by contrast, a completed initiative can simply be transformed into a template with a simple command, so that it can then be used for the next one.

Further, it is noted that the present invention may be configured and operable on a number of computing platforms, for example, J2EE or the '.'NET platforms discussed above. The present invention may be configured and operated on any conventional computer or system and may be configured in hardware, software, or a combination of both. The user interface of the present invention includes a visual user interface. However, the user interface may include other types of non-user interfaces such as audio and sensory (e.g., touch) user interfaces that allow a user to interact with and/or receive feedback from the disclosed system.

Upon reading this disclosure, those of skill in the art will appreciate still additional alternative systems and methods for a unified model blending process and content through document and issue management with hierarchically structured process phases and tasks with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of display of data to a user, said method comprising:

displaying a popup calculator to the user via a display interface of a computer system;

performing an evaluation of a specified function of set of functions, said performing the evaluation being under interactive control of the popup calculator by the user via the display interface;

displaying a result of the evaluation to the user via the display interface;

wherein the result of the evaluation includes information derived from a plurality of tables comprised by a database;

wherein each table comprises at least one column and at least one row;

wherein the plurality of tables describes a plurality of components of a hierarchy in which hierarchical relationships between components of the hierarchy are defined;

wherein the database stored in the computer system, and wherein the plurality of tables comprises a component table and a plurality of component-specific tables;

wherein the component table encompasses all components of the hierarchy, wherein the components of the hierarchy encompass a plurality of component types, and wherein the at least one column of the component table comprise a component_id column that identifies each component, a parent_id column that identifies a parent component of each component, and a type_name column that specifies a component type of each component;

wherein each component-specific table encompasses only components of the hierarchy such that each component has a component type that is a specific component type, wherein the at least one column of each component-specific table comprises a component_id column and a component information column, wherein the component_id column of each component-specific table identifies each component in each component-specific table, is a primary key for each component-specific table, and is a foreign key pointing to a corresponding component in the component table, and wherein the component information column of each component-specific table comprises a description or content of each component in each component-specific table.

2. The method of claim 1, wherein the result of the evaluation is constrained by a specified filter argument that filters a set of results of the evaluation.

3. The method of claim 1, wherein the set of functions comprises a lookup function, and wherein the result of the evaluation of the lookup function is an identification of a single component of the plurality of components for a specified component type comprised by the single component.

4. The method of claim 1, wherein the set of functions comprises a lookup function, and wherein the result of the evaluation of the lookup function is an identification of at least two components of the plurality of components for a specified component type comprised by the at least two components.

5. The method of claim 1, wherein the set of functions comprises a task assignment function, and wherein the result of the evaluation of the task assignment function is an identification of preliminary analysis tasks assigned to the user by priority.

6. The method of claim 1, wherein the set of functions comprises a component identification function, wherein the result of the evaluation of the component identification function is an identification of at least one component of the plurality of components, and wherein the at least one component is beneath a specified parent component of the plurality of components.

7. The method of claim 6, wherein an identification of a first component of the at least one component includes an identification of a position of the first component in a path though the hierarchy.

* * * * *